Figure 1:
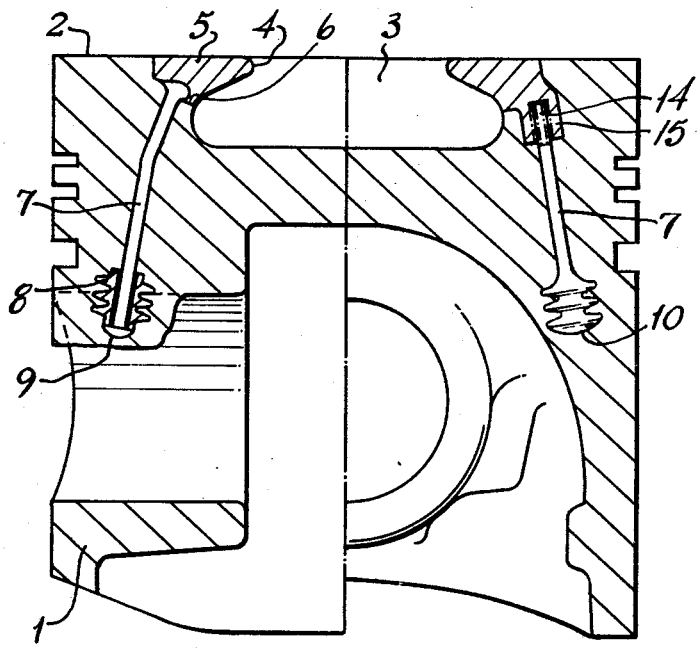

United States Patent [19]

Dunn et al.

[11] 4,140,096

[45] Feb. 20, 1979

[54] PISTONS FOR INTERNAL COMBUSTION ENGINES

[75] Inventors: Stephen J. Dunn, Helpston; Glyn H. Youdan, Bainton, both of England

[73] Assignee: Perkins Engines Limited, London, England

[21] Appl. No.: 782,695

[22] Filed: Mar. 30, 1977

[30] Foreign Application Priority Data

Mar. 31, 1976 [GB] United Kingdom ............... 12916/76

[51] Int. Cl.² .......................... F02F 3/26; F02F 3/00
[52] U.S. Cl. ........................... 123/193 P; 123/193 CP
[58] Field of Search ....... 123/193 P, 193 CP, 191 SP, 123/191 A, 32 C, 32 AA

[56] References Cited

U.S. PATENT DOCUMENTS

| | | | |
|---|---|---|---|
| 1,946,081 | 2/1934 | Koch | 123/193 P |
| 3,251,349 | 5/1966 | Isley | 123/193 P |

FOREIGN PATENT DOCUMENTS

| | | | |
|---|---|---|---|
| 2136594 | 2/1972 | Fed. Rep. of Germany | 123/193 P |
| 2211690 | 9/1973 | Fed. Rep. of Germany | 123/193 P |
| 2248008 | 4/1974 | Fed. Rep. of Germany | 123/193 P |
| 491974 | 9/1938 | United Kingdom | 123/193 P |

*Primary Examiner*—Ronald H. Lazarus
*Attorney, Agent, or Firm*—William R. Nolte

[57] ABSTRACT

A piston for an internal combustion engine, having a combustion chamber with an overhanging lip formed by resistant metal insert anchored in the piston by means of members extending from the insert and embedded in the piston material. A portion of the free end of each member is located in a cool portion of the piston and mechanically keyed therein and is preferably also metallurgically bonded to the piston material in order to prevent the insert being loosened during service.

8 Claims, 5 Drawing Figures

PISTONS FOR INTERNAL COMBUSTION ENGINES

The present invention relates to pistons for internal combustion engines and especially to combustion chambers for use therein.

Pistons for use in internal combustion engines, particularly diesel engines, are subjected to a combination of thermal cycling and gas pressure and flow and where a combustion chamber is formed in the crown of the piston, which is normally an aluminium-silicon alloy, cracking of the alloy in the vicinity of the mouth of the chamber has been found to occur under service conditions. It has been proposed to provide protection against such cracking by means of a copper or copper alloy insert disposed around the mouth of the chamber, and the insert may be so shaped as to form a lip or constriction.

It has been found experimentally that attempting to provide a combustion chamber lip in the form of an insert secured in the crown of the piston by mechanical keying is unsatisfactory since, due to the above mentioned adverse operating conditions, the insert becomes loosened after a relatively short exposure to such conditions.

According to the present invention there is provided a piston for an internal combustion engine comprising a piston body of a first metal having a crown incorporating therein a combustion chamber, the chamber having a lip portion constituted by an annular insert of a second metal more resistant to operating conditions in the chamber than the first metal, the insert being provided with anchoring means comprising at least one member embedded in the body and extending from the insert into a portion of the body, the temperature of which portion, at maximum operating temperature, is such that loosening of the member in that portion is prevented.

Loosening of inserts in previously known methods of anchorage in piston crowns is due, in our belief, to thermal expansion effects and creep of the piston material at the location in which the insert has hitherto been secured to the piston body. The present invention provides an insert which can be anchored in a portion of the body in which the temperature is such that no significant amount of creep occurs in the piston body material.

We have found that, by utilising the temperature gradient in the piston at operating temperature, the insert can be securely anchored in the piston body at a site at which the piston body material is in a thermal condition resistant to stresses applied to the interface between insert of piston body. Such stresses have their sources in the operating force applied to the piston crown, inertial effects and thermal cycling effects and should these stresses exceed the creep strength of the piston body material at mechanically keyed portions of the interface, yielding of the piston alloy causes a gap to be gradually opened between insert and piston alloy and the insert thus becomes loosened.

Since the amount of plastic strain of the alloy is dependent on load, time and temperature, the existence of a temperature gradient in the piston provides a progressive increase in the creep strength of the piston material in inverse proportion to the temperature. Furthermore, with decrease of temperature, thermal expansion differences between insert and piston material become less. Thus, in a certain portion of the piston body, there is a temperature in the gradient at which the conditions are most suitable for anchoring members extended by the insert.

The temperature in the vicinity of the crown in service conditions may be between 250 and 350 degrees centigrade and the progressive fall in temperature through the rest of the piston is due to cooling by contact with cylinder walls and in some cases by oil spray cooling of the under side of the piston.

Preferably the anchoring means comprises legs or other appendages attached to or integral with the insert and a preferred construction is a symmetrical arrangement of limbs of a third metal secured at one end to the insert by conventional means and having a free end by means of which anchoring is effected.

The preferred method of anchoring the free end of the limb is by means of a metallurgical bond between the first metal and the limbs or between the first metal and a suitably shaped component attached to the limb, but a purely mechanical keying effect may in some conditions be adequate. According to a feature of the invention, limbs secured at one end to the insert are provided at the free end with a portion of external configuration adapted to provide mechanical keying within the body of the piston and a metallurgical bond is effected between the surface of portion having the said configuration and the piston material.

The portion having the said configuration may be an enlarged portion of the limbs but is preferably a collar with circumferential ribs which desirably have an undulating or sinusoidal profile in cross section, the collar being secured to the free end of the limb. The collar may be made from a metal different from that of the insert, or the limb, but it should be capable of forming a metallurgical bond with the first metal or should be capable of so doing when coated with suitable bonding metal or agent. It is essential that there should be no gap at the interface between the first metal constituting the body and the metal constituting the limb or the collar. The limbs may be a variety of shapes e.g. arcuate, following the curve of the piston skirt and possibly flattened rather than cylindrical in form. The profile may be other than sinusoidal, even re-entrant in which case a forging operation may be necessary to ensure flow of aluminium alloy into the cavities.

In order to provide a good bond, the preferred method is to coat at least the portion of the limb or collar over which bonding is required with a bonding metal compatible with both the first metal of the limb or collar and to effect the bond during the operation of casting the first metal in a mould in which the insert is located.

The invention is particularly suitable for application to the diesel engine having formed in the crown a combustion chamber the mouth of which is provided with a re-entrant portion or lip. Such pistons are normally aluminium-silicon alloy castings and the incorporation of an insert of a copper base alloy by mechanical bonding has been found to be unsatisfactory due to thermal expansion effects, creep of the aluminium-silicon alloy at the high stresses and temperatures involved in the region of the crown which result in loosening of the insert. Furthermore, if a direct metallurgical bond between the copper base alloy insert and the aluminium base alloy piston is attempted undesirable diffusion effects can produce, in the long term, a severe weakening of the bond if the area of the piston in which the bond is made is heated to high temperature e.g 300 degrees centigrade.

The material from which the limbs are made must be capable of withstanding alternating tensile and compressive loads without yielding in tension or buckling in compression. Nor must the limbs stretch or compress elestically to an extent which would produce unacceptable rise or fall of the lip. Although a limb functions as a strut it need not be column shaped but could be a sheet formed or folded to provide an effective strut, for example, a sleeve partially encircling the piston and provided with apertures to permit ready flow of aluminium alloy during casting.

In a diesel engine piston constructed in accordance with the invention, the insert forming the lip preferably a high thermal conductivity alloy such as copper - 0.5% beryllium 2.5% cobalt alloy or a copper - 2% nickel alloy or a copper - 8% aluminium alloy, such alloys being well known commercially. The limbs and collars are preferably of the same material, for example, a cast iron containing nominally 3% carbon, 14% nickel, 7% copper and 3% cobalt - commercially available as NIRESIST (Registered Trade Mark), or alternatively these components can be of an austenitic, e.g. stainless steel composition, etc. Such materials are suitable for bonding to aluminium-silicon alloy as the thermal expansion properties are compatible and, of course, have a melting point well above that of the piston alloy. Limbs and collars may be integral with the annular insert, for example, cast as one piece, and are therefore of the same material as the insert.

The thermal gradients throughout the body of the piston at operating temperatures are well known and regions having specified temperatures can be accurately located by those skilled in the art. Furthermore, the temperature at which creep of the aluminium-silicon alloy is of insignificant amount relative to the service life of the piston can be ascertained from knowledge of the creep properties of the alloy and, in general, is about 150 degrees centigrade for piston alloys.

The preferred bonding materials for use with the nickel-cast iron or stainless steel interface with the piston alloy are aluminium-silicon alloys such as are used in the "Alfin" process (Trade Mark), zinc and nickel. Metals can be applied by electro-depositions or by spraying methods and zinc and aluminium alloys can also be applied by dipping the component in molten metal as in the well known dip-galvanizing process and the "Alfin" bonding process. Nickel and Zinc also used for copper base alloys will form a bond by diffusion at elevated temperatures into the interface layers of surfaces being joined during the casting of the piston without formation of undesirable intermetallic compounds or other metallic phases either initially or as a result of prolonged exposure to service temperatures. It is preferred that the limbs, collars and insert should be in one material with a zinc coating only on the collar for formation of a metallurgical bond.

It is advantageous to produce a metallurgical bond between the anchoring portion of the limbs and the bonding metal during the coating process and this can be achieved by immersion in the molten coating metal for a given period. Heat treatment of a deposited, e.g. plasma sprayed, coating may also be utilised to this end.

The invention provides, therefore, a method of manufacturing a piston incorporating a combustion chamber constructed with at least a portion of the combustion chamber being a metal insert which comprises the steps of providing the insert with limbs having anchoring portions as hereinbefore defined to form an insert assembly, coating at least the anchoring portions with a bonding metal, introducing the insert assembly into a piston body mould, casting method in the mould around the insert assembly and forming a metallurgical bond between the anchoring portions of the limbs by diffusion of the bonding metal into the cast metal.

In a variation of this method, the coated insert assembly may be incorporated into a piston by means of a forging operation instead of a casting operation.

In the accompanying drawings

FIG. 1 is a cross section in perpendicular planes parallel with the axis of a piston in accordance with the invention.

FIGS. 2, 3, 4, and 5 show various alternative shapes and configurations of end portions for anchoring the insert in the body of the piston.

One embodiment of the invention will now be described, by way of example, with reference to the accompanying FIG. 1 which is fragmentary cross sectional elevation of an aluminium-silicon alloy piston body 1, having in the crown 2 a combustion chamber 3 bounded around its open end by a lip 4 forming a reentrant profile. The lip 4 is constituted by an insert 5 of a copper 0.5% beryllium 2.5% cobalt alloy in the form of an annulus having a back face 6 which abuts the aluminium-silicon alloy. Secured to the back face 6 by conventional joints, for example, brazing, are three symmetrically spaced limbs 7 of a nickel cast iron nominally consisting of 3% carbon, 14% nickel, 7% copper and 3% cobalt, a collar 8 of the same material securely located on the limb 7 by the head 9. The collar 8 is smoothly ribbed circumferentially to ensure even metal flow over its surface during casting of the piston alloy and to provide an extended surface for bonding as well as for mechanical keying.

In a piston of the kind herein illustrated, the service temperature at the crown 2 is approximately 350 degrees centigrade and the temperature distribution is known to be such that in the region of the piston ring grooves the temperature is approximately 230 degrees centigrade and in the region in which the collar 8 is located, the temperature is approximately 150 degrees centigrade. From the creep properties of the alloy it is known that creep properties of the aluminium silicon alloy used is negligible at 150 degrees centigrade. The location of the collar 8 is determined from a temperature plot on a cross section of the piston at the design stage.

The insert 5, which may initially be in the form of a disc, is joined to its limbs 7 and collars 8 prior to casting of the piston body 1 in a mould in conventional manner. The collars 8 are coated with zinc by electro deposition in a conventional electrolyte and the assembly of insert 5 and limbs 7 in a heated condition placed in the appropriate position in a piston body mould. Moulten aluminium silicon alloy is cast into the mould to surround the limbs 7 and the back face 6. During contact with the molten and subsequently hot solidified cast metal the collars 8 form a metallurgical bond by diffusion of the zinc into the surface layers of both the aluminium silicon and the nickel cast iron. The cavity 3 and lip are subsequently formed by a machining operation.

Instead of the separate collars 8, an enlarged portion 10 integral with the limb 7 can be used in conjunction with a threaded shank 14 engaging threaded boss 15 of the insert 5.

Figures 2, 3, 4:
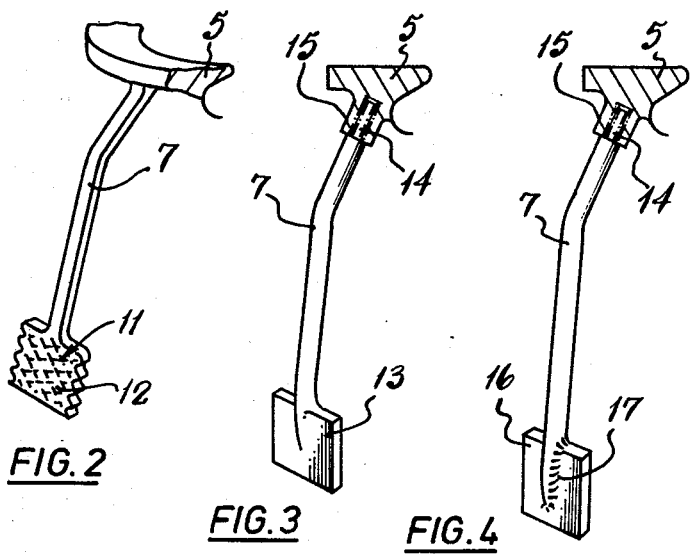

Alternative embodiments of limbs and anchoring portions are illustrated in FIGS. 2, 3 and 4 which are part perspective, part cross-sectional views. In FIG. 2, the limb 7 is integral with the insert 5 and terminates in an integral anchoring portion in the form of a spade-end 11 provided with corrugated edges and a rough surface 12 for mechanically keying to the piston body.

In the form shown in FIG. 3, the limb 7 and spade-end 13 are likewise integrally formed but the upper end of the limb 7 terminates in a threaded shank 14 which engages the internally threaded boss 15 of the insert 5.

The arrangement shown in FIG. 4, includes the threaded connection shown in FIG. 3, namely, the engagement of the shank 14 in the boss 15, but the spade-end 16 is attached to the limb 7 by welding or brazing at the junction 17.

It will be appreciated that in FIG. 2, the insert, limb and spade-end are of the same material, whilst in FIG. 3 the insert and limb and integral spade-end can be of the same material or two different materials and in FIG. 4 the same or two or three materials can be used. Furthermore, the shank 14 and threaded boss 15 can be replaced by alternative fixing methods.

Figure 5:
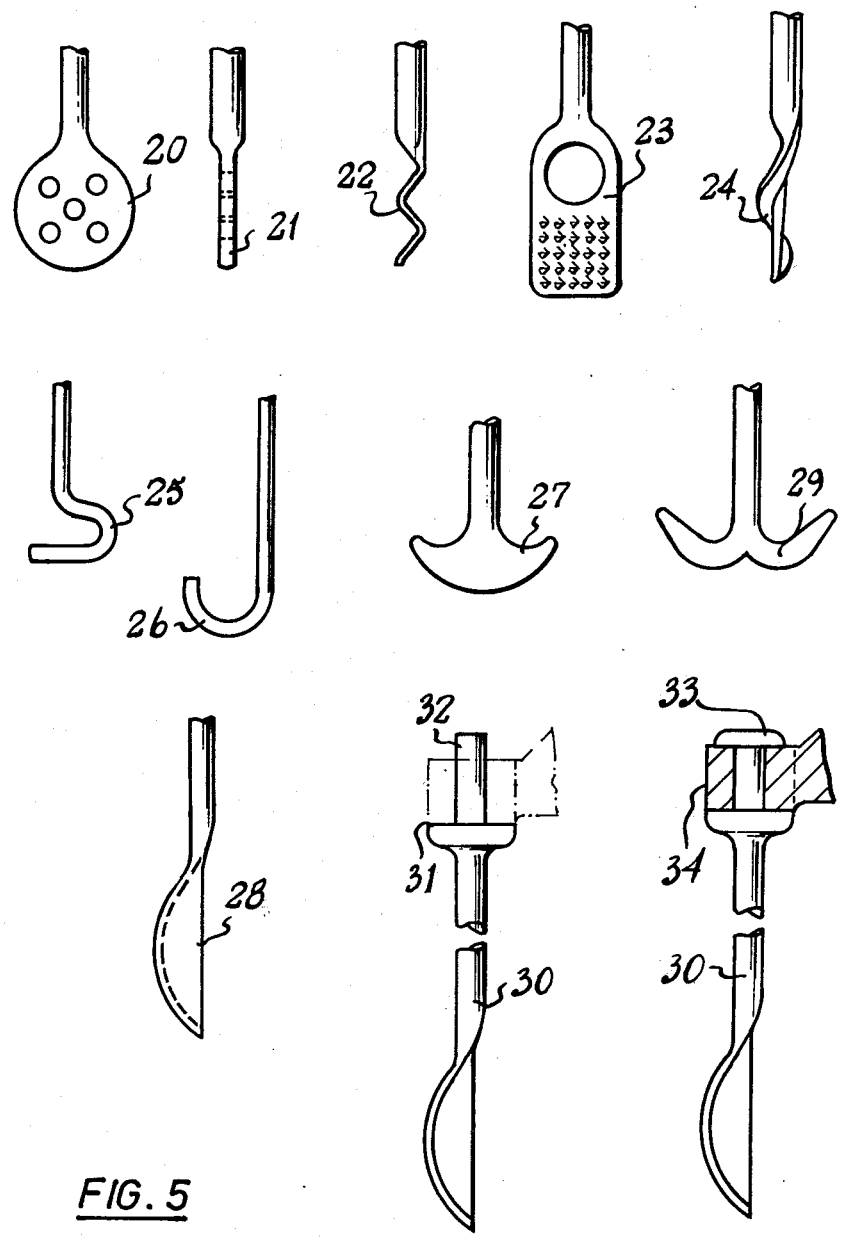

The end portions of the limbs 7 can be produced in a wide variety of shapes and configurations designed to improve mechanical keying with the material of the piston as shown in FIG. 5. The end portion 20 is a disc having perforations, and is shown as a side view 21. A flattened end portion 22 is of wave form. Another alternative 23 is a flattened portion with a perforation and a roughened area. A helical shape 24 can also be used. Two forms of hook 25 and 26, an upset portion 27 and a bifurcated portion 29 are other possibilities. A spoon or half-spoon shape 28 can be varied to provide a member 30 having a shoulder 31 and a shank 32 which can be located in an aperture in a lug 34 which forms part of the insert 5, and a protruding part of the shank 32 formed into a rivet head 33.

What we claim is:

1. A piston for an internal combustion engine comprising a piston body of a first metal, a crown in said piston body, a combustion chamber in said crown, a lip portion overhanging said combustion chamber, said lip portion being constituted by an annular insert of a second metal more resistant to operating conditions in said chamber than said first metal, limbs of a third metal secured at one end to the annular insert comprising at least one member embedded in said body and extending from said insert into a portion of said body having a temperature of about 150 degrees centigrade at maximum operating temperature of said piston.

2. A piston according to claim 1 wherein, said annular insert metal is capable of forming a metallurgical bond with the first metal when coated with a bonding metal or agent.

3. A piston according to claim 1 wherein the said annular insert is made from a copper base alloy selected from a group consisting of 0.5% beryllium, 2.5% cobalt, remainder copper, 8% aluminium remainder copper, and 2% nickel remainder copper.

4. A piston according to claim 1 wherein the said limb is made from a ferrous material selected from the group consisting of a cast iron containing 3% carbon, 14% nickel, 7% copper, 3% cobalt remainder iron, and an austenitic steel.

5. A piston according to claim 1 wherein the said insert is made from a ferrous material selected from the group consisting of a cast iron containing 3% carbon, 14% nickel, 7% copper, 3% cobalt remainder iron, and an austenitic steel.

6. A piston according to claim 1 wherein the limbs are made integrally with the annular insert.

7. A piston according to claim 1 wherein said anchoring means consists of a ferrous material selected from the group consisting of a cast iron containing 3% carbon, 14% nickel, 7% copper, 3% cobalt remainder iron and an austenitic steel, and said anchoring means is coated with a bonding metal selected from the group consisting of aluminium silicon alloy, zinc and nickel.

8. A piston according to claim 1 wherein said anchoring means consists of a copper alloy selected from a group consisting of 0.5% beryllium, 2.5% cobalt remainder copper, 8% aluminium remainder copper, and 2% nickel remainder copper, and said anchoring means is coated with a bonding metal selected from the group consisting of zinc and nickel.

* * * * *